Oct. 18, 1938.  E. G. MUELLER  2,133,631

LINK STRUCTURE

Filed Dec. 8, 1937

INVENTOR
Emil G. Mueller,
BY
HIS ATTORNEY

Patented Oct. 18, 1938

2,133,631

UNITED STATES PATENT OFFICE 2,133,631

LINK STRUCTURE

Emil G. Mueller, Swissvale, Pa., assignor to The American Brake Company, Swissvale, Pa., a corporation of Missouri Application December 8, 1937, Serial No. 178,775

8 Claims. (Cl. 74—103)

My invention relates to link structures.

Link structures embodying my invention are particularly suitable for, although in no way limited to, use in connection with brake rigging for railway rolling stock, for coupling the push rod of the usual brake cylinder, and the hollow piston rod in which the push rod is rockably mounted, with the usual brake lever, and one object of my invention is to provide a novel link structure of this type which will permit a maximum amount of rocking movement between the two rods, but which will prevent relative longitudinal movement between the two rods.

Other objects and characteristic features of my invention will appear as the description proceeds.

I shall describe one form of link structures embodying my invention, and shall then point out the novel features thereof in claims.

Figure 1:
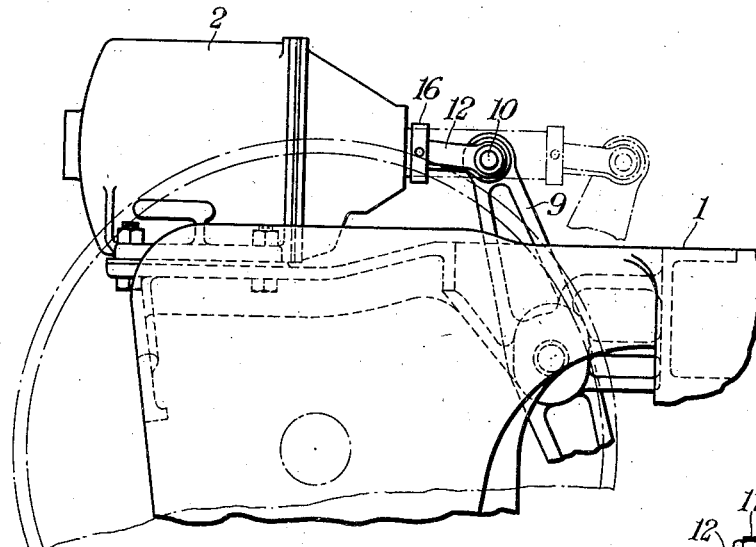
Figure 4:
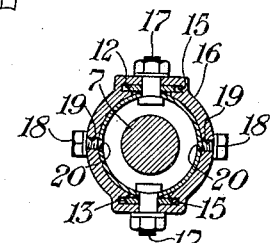
Figure 2:
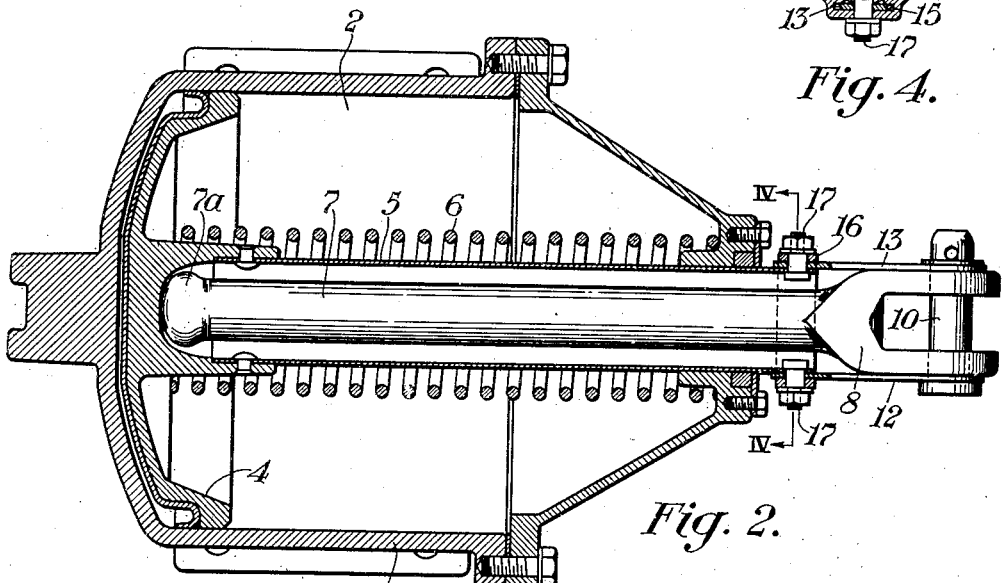
Figure 3:
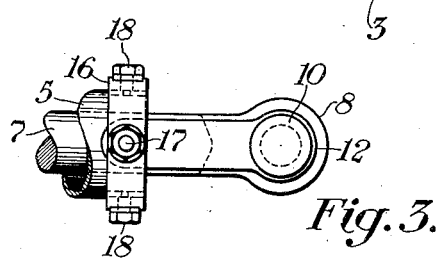

In the accompanying drawing, Fig. 1 is a fragmentary side elevational view of a locomotive truck provided with a brake cylinder, the push rod and piston rod of which are connected with a brake cylinder lever by means of a link structure embodying my present invention. Fig. 2 is an enlarged horizontal sectional view of the brake cylinder and link structure shown in Fig. 1. Fig. 3 is an enlarged side view of the link structure shown in Fig. 1. Fig. 4 is a sectional view taken on the line IV—IV of Fig. 2.

Similar reference characters refer to similar parts in each of the several views.

Referring first to Fig. 1, the reference character 1 designates a locomotive trailer truck, which truck is supported by wheel and axle assemblies in the usual and well-known manner, only a portion of the truck and a portion of one wheel being shown in the drawing. Mounted on the truck 1 is a brake cylinder 2 comprising a casing 3 containing a reciprocable piston 4 which drives a hollow piston rod 5, the piston 4 and piston rod 5 being biased to a retracted or brake releasing position by a spring 6. The brake cylinder also comprises a push rod 7 which extends into the hollow piston rod 5 with considerable clearance, and is provided at its inner end with a rounded upset portion 7a, whereby the push rod is free to rock through a relatively large angle with respect to the piston rod.

The push rod 6 is provided at its outer end with an integral jaw 8 which receives the upper end of a brake cylinder lever 9, and is operatively connected with the lever 9 by means of a pin 10 which passes through the jaw and through the lever. The brake cylinder lever 9 is pivotally attached intermediate its ends to the truck frame, and is adapted to be connected at its lower end with suitable brake rigging, not shown, in such manner that rotation of the lever in a clockwise direction, as viewed in Fig. 1, from the extreme position shown, will apply the brakes to the truck wheels, but that rotation of the lever to the position shown will release the brakes.

With the portion of the apparatus thus far described, it will be apparent that movement of the piston 4 to its brake applying position when the lever 9 occupies the position shown will act through the push rod 7 to rotate the lever to its brake applying position, and that as the lever moves to its brake applying position the arc through which it swings will cause the push rod 7 to rock within the piston rod. It will further be apparent that the jaw 8 is so designed that when the upset end of the push rod is engaging the piston, the jaw will be disposed wholly outside of the piston rod, thus permitting the push rod to rock through the maximum amplitude with respect to the piston rod, and hence permitting the arm of the brake cylinder lever which is connected with the piston rod to be relatively short. This is particularly desirable since clearance conditions in many applications of brakes to trailer trucks necessitate that this lever arm be made as short as possible.

The apparatus also comprises linkage embodying my invention for operatively connecting the push rod 7 with the piston rod 5 to prevent relative longitudinal movement between the rods without interfering with the necessary rocking movement of the push rod relative to the piston rod when the lever is rotated. As here shown, this linkage comprises two links 12 and 13 which are pivotally mounted at one end on the pin 10 on opposite sides of the jaw 8, and which extend at the other end with some clearance into slots 15 provided in a collar 16 and are pivoted on the shanks of bolts 17 extending through the slots. The collar 16 surrounds the outer end of the piston rod, and the bolts 17 pass through the piston rod and through the collar diametrically opposite each other and serve both as a means for securing the collar to the piston rod, and also as a means for pivotally connecting the links 12 and 13 with the piston rod. The collar is also secured to the piston rod at points spaced 90° from the bolts 17 by means of stud bolts 18 which are threaded into tapped holes 19 formed in the collar and are provided at their inner ends with unthreaded portions which extend into clearance holes 20 formed in the piston rod.

It will be obvious that, with the push rod 7 connected with the piston rod 5 by means of the links 12 and 13 and the collar 16 in the manner just described, relative longitudinal movement between the push rod and the piston rod is effectively prevented, and that, as a result, when the brake cylinder lever has been moved to its brake applying position and fluid is exhausted from the brake cylinder, the force exerted on the piston by the release springs will be transmitted to the lever through the piston rod and the links, thereby effecting the movement of the lever to its brake releasing position in which it is shown in the drawing. It will also be obvious that, as the lever moves between its two extreme positions, the links 12 and 13 will rotate about the bolts 17 and the pin 10 in a manner to permit the necessary rocking movement of the push rod within the piston rod.

One advantage of a structure constructed in accordance with my invention is that the jaw on the push rod need only be long enough to receive the upper end of the brake cylinder lever, and that, as a result, the brake cylinder can be mounted relatively close to the upper end of the brake cylinder lever. This is particularly desirable where, as frequently happens, the space available for the brake cylinder and associated lever is limited by clearance conditions.

Another advantage of a structure embodying my invention is that it is economical to manufacture and easy to install.

Although I have herein shown and described only one form of link structures embodying my invention, it is understood that various changes and modifications may be made therein within the scope of the appended claims without departing from the spirit and scope of my invention.

Having thus described my invention, what I claim is:

1. In combination, a lever, a cylinder for actuating said lever comprising a casing, a piston in said casing driving a hollow piston rod, a push rod rockably mounted in said piston rod and operatively connected to said lever, and means pivotally connected to said piston rod and to said push rod for permitting said push rod to rock relative to said piston rod and to prevent relative longitudinal movement between the rods.

2. In combination, a brake cylinder lever, a brake cylinder containing a piston which drives a hollow piston rod, a push rod pivotally attached at one end to said cylinder lever and extending with clearance into said piston rod and cooperating at its inner end with said piston when said piston is moved toward said lever to rotate said lever in one direction, and means including a link pivotally connected with said lever and with said hollow piston rod for rotating said lever in the other direction when said piston is moved away from said lever.

3. In combination, a cylinder containing a piston which drives a hollow piston rod, a push rod extending into said piston rod and bearing at its inner end against said piston, said push rod being provided at its outer end with a jaw, a pivoted brake cylinder lever having one end pivotally connected with said push rod by means of a pin passing through said jaw, a collar surrounding the outer end of said piston rod and secured thereto, and two links pivotally mounted at one end on said pin on opposite sides of said jaw and pivotally attached at the other end to said collar.

4. In combination, a brake cylinder comprising a casing, a piston reciprocably mounted in said casing and driving a hollow piston rod, a push rod rockably mounted in said piston rod and provided at its outer end with a jaw, a brake cylinder lever pivotally connected to said push rod by means of a pin passing through said jaw and said lever, and means for connecting said lever with said piston rod in a manner to permit said push rod to rock relative to said piston rod comprising a collar secured to the outer end of said piston rod by means of a pair of bolts spaced 90° apart and two links pivotally mounted at one end on said pin on opposite sides of said collar and pivotally mounted at the other end on said bolts.

5. In combination, a brake cylinder comprising a casing, a piston reciprocably mounted in said casing and driving a hollow piston rod, a push rod rockably mounted in said piston rod and provided at its outer end with a jaw, a brake cylinder lever pivotally connected to said push rod by means of a pin passing through said jaw and said lever, and means for connecting said lever with said piston rod in a manner to permit said push rod to rock relative to said piston rod comprising a collar secured to the outer end of said piston rod by means of a pair of bolts spaced 90° apart and two links pivotally mounted at one end on said pin on opposite sides of said collar and pivotally mounted at the other end on said bolts, said collar being provided with slots which receive the adjacent ends of the links.

6. In combination, a brake cylinder containing a piston adapted to actuate a hollow piston rod and thereby a push rod rockably mounted in the piston rod, a jaw on the outer end of said push rod for driving attachment to a movable brake rigging element and means pivotally connected to said piston rod and to said jaw for permitting said push rod to rock relative to the piston rod and for preventing relative longitudinal movement between the rods.

7. In combination, a brake cylinder containing a piston adapted to actuate a hollow piston rod and thereby a push rod rockably mounted in the piston rod, a jaw on the outer end of said push rod, a pin extending across said jaw for the attachment of a brake rigging element to be actuated by said push rod, and means pivotally connected to said push rod and said pin for permitting said push rod to rock relative to said piston rod and for preventing relative longitudinal movement between the rods.

8. In combination, a brake cylinder containing a piston adapted to actuate a hollow piston rod and thereby a push rod rockably mounted in the piston rod, a jaw on the outer end of said push rod, a pin extending across said jaw for the attachment of a brake rigging element to be actuated by said push rod, and a member extending between and cooperating with the piston rod and said pin for permitting said push rod to rock relative to the piston rod and for preventing relative longitudinal movement between the rods.

EMIL G. MUELLER.